United States Patent
Sladek et al.

(10) Patent No.: US 7,979,158 B2
(45) Date of Patent: Jul. 12, 2011

(54) BLENDING ALGORITHM FOR TRAJECTORY PLANNING

(75) Inventors: Bohumir Sladek, Prague (CZ); Jatin P. Bhatt, Highland Hts, OH (US); William C. Schwarz, Shaker Heights, OH (US); Bhanu K. Gouda, Mayfield Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 933 days.

(21) Appl. No.: 11/831,414

(22) Filed: Jul. 31, 2007

(65) Prior Publication Data
US 2009/0037021 A1  Feb. 5, 2009

(51) Int. Cl.
*G05B 19/04* (2006.01)
(52) U.S. Cl. ...................................................... 700/246
(58) Field of Classification Search .................. 700/184, 700/186, 188, 189, 246, 262; 318/560, 567
See application file for complete search history.

(56) References Cited

U.S. PATENT DOCUMENTS

| | | | |
|---|---|---|---|
| 5,331,266 | A | 7/1994 | Widmann et al. |
| 5,602,968 | A | 2/1997 | Volpe |
| 6,341,246 | B1 | 1/2002 | Gerstenberger et al. |
| 6,714,201 | B1 | 3/2004 | Grinstein et al. |
| 6,922,606 | B1 * | 7/2005 | Yutkowitz ............. 700/187 |
| 7,076,322 | B2 | 7/2006 | Chandhoke |
| 2002/0129333 | A1 | 9/2002 | Chandhoke et al. |
| 2002/0191023 | A1 | 12/2002 | Chandhoke et al. |
| 2003/0139848 | A1 | 7/2003 | Cifra et al. |
| 2003/0144751 | A1 | 7/2003 | Chandhoke et al. |
| 2006/0150149 | A1 | 7/2006 | Chandhoke et al. |

FOREIGN PATENT DOCUMENTS

| | | |
|---|---|---|
| EP | 1102139 | 2/2004 |
| EP | 1398680 | 11/2004 |
| EP | 1398682 | 11/2004 |

* cited by examiner

*Primary Examiner* — Kim T Nguyen
(74) *Attorney, Agent, or Firm* — Fay Sharpe LLP; R. Scott Speroff; John M. Miller

(57) ABSTRACT

The present exemplary embodiment relates to motion control and planning algorithms to facilitate execution of a series of moves within a motion trajectory. In one example, a trajectory is specified as a sequence of one or more path segments. A velocity profile is calculated for each of the one or more path segments, wherein each velocity profile is divided into a blend-in region, a blend-out region and a remainder region. Each path segment is executed such that the blend-in region of its velocity profile overlaps only with the blend-out region of the previous profile.

13 Claims, 13 Drawing Sheets

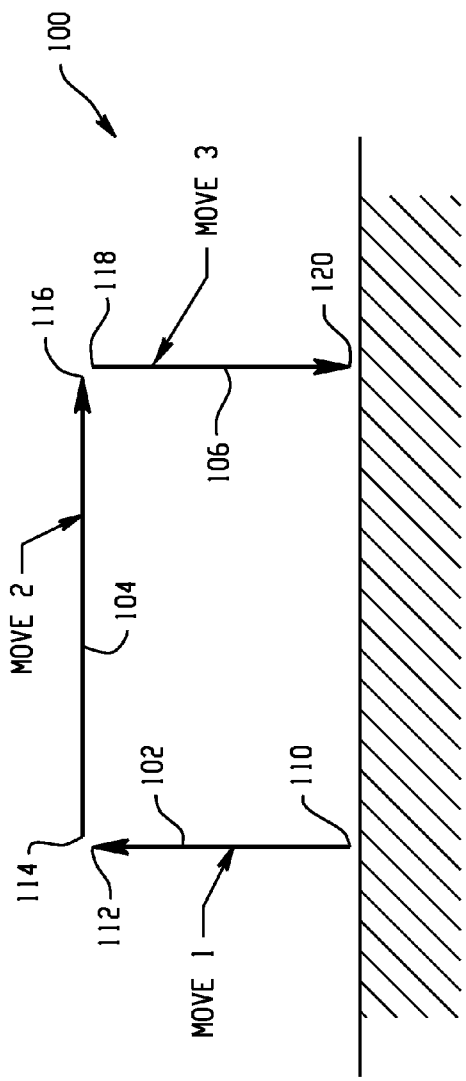
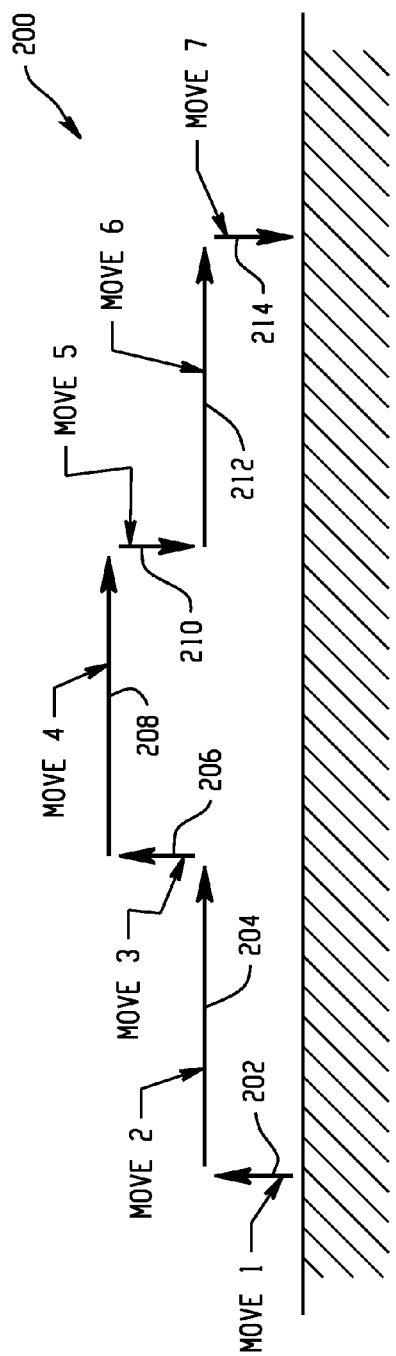

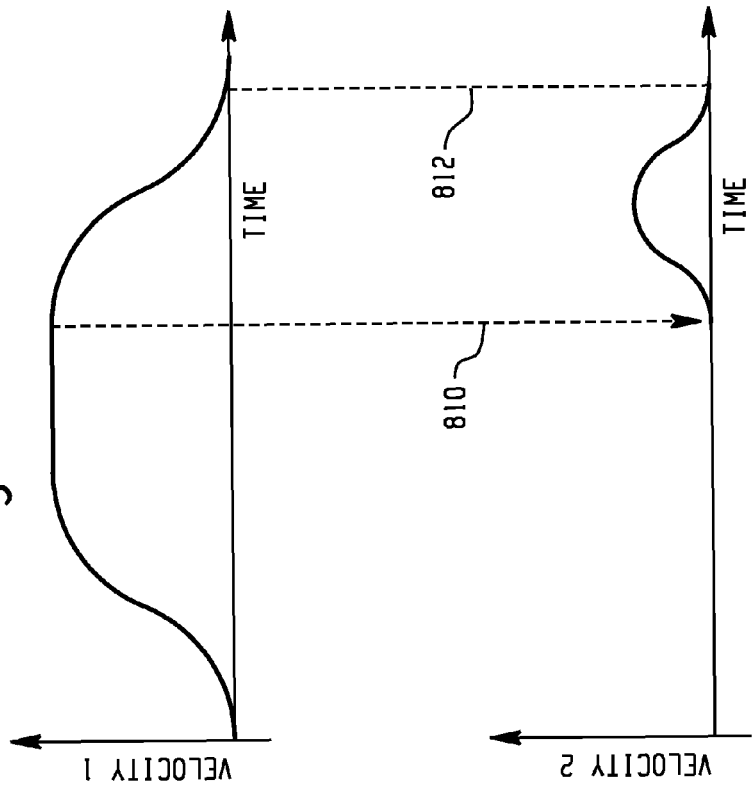
Fig. 9b
Fig. 9c
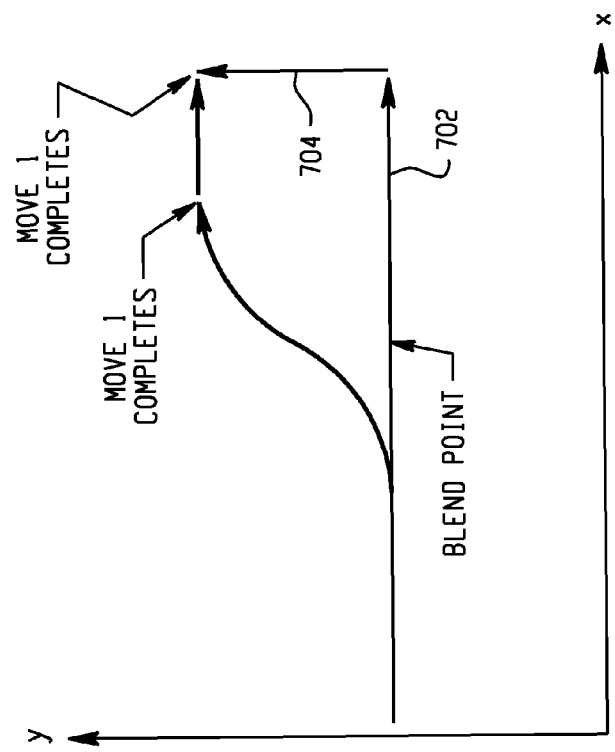
Fig. 9a

BLENDING ALGORITHM FOR TRAJECTORY PLANNING

BACKGROUND

The present exemplary embodiment relates to motion control and planning algorithms. It finds particular application with increasing the accuracy and lowering execution time of trajectories by improving blending between moves associated therewith. In one example, an algorithm is utilized to control the trajectory of a robot. However, it is to be appreciated that the present exemplary embodiment is also amenable to other like applications.

The production of goods generally includes movement in one or more axes to facilitate their assembly and manufacture. In one example, robotics are employed to bring components to a product as it moves through an assembly process. In this manner, the robot picks up a component from an offline tray and moves the component to an appropriate location on the product for assembly. The motion can involve rapid and precise movement to insure that production is accomplished at an optimum speed.

In some cases, the motion required from one location to another can involve specific obstacles that prevent the use of a direct path between a start and end point. As a result, an indirect path must be employed. This indirect path can require the programming of a robot or other automated motion device to follow a path that avoids the obstacle while minimizing the time lost in executing the full motion path. Typically, the path that is followed is comprised of a plurality of moves that are executed in series. Thus, the granularity of the motion path is easy to control as there are an infinite number of moves that can be programmed to accomplish substantially any motion path.

To facilitate motion within a production environment, automated machines (e.g., robots) can be programmed with a set of instructions that dictate the location, speed, path, etc. of their motion. These instructions can be executed in succession based on instruction type, location within an instruction set, priority, etc. Further, the instructions can be based upon substantially any coordinate system such as a Cartesian coordinate system, a non-Cartesian coordinate system, a SCARA robot, a Delta robot, a cylindrical, a spherical, a polar, a picker, an articulated dependent, and an articulated independent joint space.

In addition, instructions can be executed in relation to an event within a motion profile. In one example, an instruction can be executed once a particular parameter is met, such as an acceleration value. A more detailed treatment of the creation and execution of motion instructions is presented in Weinhofer, et al. (U.S. Pat. No. 7,180,253) which is incorporated in its entirety herein.

One difficulty with programming motion is transitioning between each of the plurality of disparate paths. A particular motion path (for example a pick and place cycle) may require three different moves between a start and an end point. In this case, there are two points where motion transitions between moves. The first transition is between the first and second move and the second transition is between the second and third move. It is to be appreciated that if N is the number of moves in a particular path, N−1 is the number of transition points associated therewith.

A blend radius can be employed to define the beginning and end of a transition. The blend radius can be expressed as the distance from a move's endpoint wherein the next move's instructions are simultaneously executed. Conventionally, there is no guarantee that blending will occur only within the blend radius. Some combinations of move lengths and other move parameters can cause the moves to blend outside the blend radius which can cause undesired motion. In one example, the transition within a second blend radius can occur before the transition in a first blend radius has been complete which can cause undesired movement and associated deleterious effects. Thus, what are needed are systems and methods that facilitate accurate, rapid transitions between moves within motion applications.

BRIEF DESCRIPTION

The subject embodiments can be employed to produce smooth, jerk free cycles with minimal acceleration to carry a mass in a space. Utilizing the improved algorithm described herein, an optimum number of pick cycles can be employed for robotic applications, such as a Delta robot, for example. Since the method of programming cycles is simple and flexible, it is extremely suitable for applications where pick-place cycle targets are varied because of integrated vision with conveyor tracking.

In one aspect, a method is employed to generate a motion system trajectory. A trajectory is specified as a sequence of one or more path segments. A velocity profile is calculated for each of the one or more path segments, wherein each velocity profile is divided into a blend-in region, a blend-out region and a remainder region. Each path segment is executed such that the blend-in region of its velocity profile overlaps only with the blend-out region of the previous profile.

In another aspect, a method is employed that generates a symmetric motion trajectory. A path is symmetric if the path from a start point to an end point is identical to the path from the end point to the start point. A trajectory is specified as a sequence of one or more moves and a velocity profile is calculated for each of the one or more moves. Each velocity profile is divided into a blend-in region, a blend-out region and a remainder region. The length of the blend-out regions for each current velocity profile are evaluated in view of the length of the blend-in regions for each subsequent profile. Both the deceleration and the deceleration jerk of the current move are reduced, if the blend-out region of the current move is the shorter than the blend-in region of the subsequent move to minimize the difference in duration of both regions. Both the acceleration and the acceleration jerk of the subsequent move are reduced if the subsequent blend region is shorter than the current blend region, to minimize the difference in duration of both regions. A time offset is calculated and applied for the subsequent move.

In yet another aspect, a method is employed to specify parameters of a motion trajectory algorithm. A path for motion is specified that includes at least two independent moves, a current move and a subsequent move, the current move and subsequent move are defined on a rolling basis as the motion trajectory is executed. A velocity profile is calculated for each of the moves wherein each velocity profile is divided into a blend-in region, a blend-out region and a remainder region. The blend-out region of the profile of the current move and the blend-in region of the profile of the subsequent move are evaluated. The start time of the profile of the subsequent move is calculated. A blending region is created that is comprised of the blend-in region of the profile of the current move and the blend-out region of the profile of the subsequent move to complete the trajectory.

The last three steps are repeated until the motion trajectory is complete.

BRIEF DESCRIPTION OF THE DRAWINGS

FIGS. 1a and 1b illustrate motion trajectories comprised of a plurality of independent moves, in accordance with an exemplary embodiment;

FIGS. 9a, 9b and 9c illustrate the motion of a first move and a second move and the velocity profiles associated therewith, utilizing a conventional algorithm in accordance with an exemplary embodiment;

DETAILED DESCRIPTION

Figure 2A:
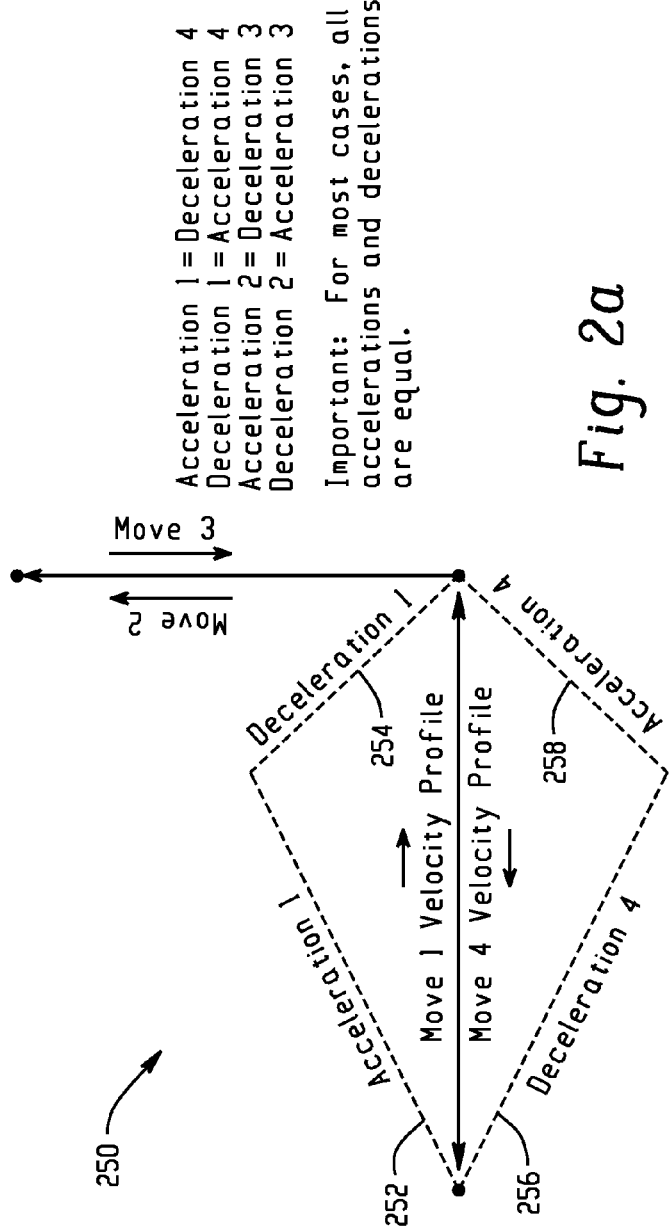
FIG. 2a illustrates the concept of interchanging acceleration and deceleration values for flipping around the time axis, in accordance with an exemplary embodiment.

Standard blending algorithms can generate trajectories which are not symmetric (e.g., trajectory from a start point to an end point is not the same as that from the end point to a start point) and which do not always stay close to their asymptotes. Blending starts when a profile reaches its blend point during its travel. Utilizing conventional algorithms, blending can begin at the point where a profile start to decelerate or at the point where a profile's remaining distance to go is less than a predefined limit. Such algorithms are dependent solely on information related to the currently executed move and are not concerned with moves to be executed subsequently. As a result, the trajectory from a start point to an end point is typically different than the trajectory from an end point to a start point. The improved algorithm, described herein, removes such deficiencies by delaying the moment when blending starts by a predetermined time delay and/or adjusting the dynamics of the blend-in and blend-out regions.

The process works in two steps. During the first step, the blend-out region of the first profile and the blend-in region of the second profile is evaluated. During the second step, the start time of the second profile is calculated, so that only the blend-in region of the first profile and the blend-out region of the second profile participate in blending and the whole trajectory completes in the shortest time. Typical examples of blending regions are: 1) a blend-out region of the first profile: its deceleration segment and a blend-in region of the second profile: its acceleration segment; 2) a blend-out region of the first profile: remaining distance to go is less than a blend radius and a blend-in region of the second profile wherein a command position is less than a blend radius; 3) a blend-out region of the first profile: remaining distance to go is less than fifty percent of first move's length and a blend-in region of the second profile: a command position is less than one-hundred percent of second move's length. If the move consists of more than two profiles, different formulas can be used for calculation of blend-out and blend-in regions of each profile.

When the blending region for the two moves contains a minimum of a) the entire deceleration segment of the first move and b) the acceleration segment of the second move, then the trajectory shape can be further improved by using an optional additional step in the calculation of the profile trajectories. The improvement is most noticeable, if the second move has higher command velocity than the first move and both moves are almost collinear wherein jerk is specified as a percent of time.

First, the blend-in and blend-out regions are evaluated via conventional means. Next, an additional optimization is made wherein after the initial blend-in and blend-out regions are evaluated, the shorter one is chosen. If the blend-out region of the first move is the shorter one of the two, then both the deceleration and the deceleration jerk of the first move are reduced so that the difference in duration of both regions is minimized (e.g., zero if possible). If the second move's blend-in radius is the shorter one of the two, then both the acceleration and the acceleration jerk of the second move are reduced so that the difference in duration of both regions is minimized (e.g., zero if possible). A time offset of the second move is calculated and applied.

FIG. 1a illustrates a motion trajectory 100 that is comprised of three independent moves: a first move 102, a second move 104, and a third move 106. The motion 100 can be employed with a "pick and place" motion that is commonly utilized by robots in various manufacturing/production applications. In this example, the first move 102 is an Up Move; the second move 104 is a Horizontal Move; and the third move 106 is a Down Move. Move 102 has a start point 110 and a stop point 114. In this example, the start point 110 begins from zero velocity or rest. Once the first move 102 ends at 112, the second move 104 begins at 114 and ends at 116. Once the second move 104 ends, the third move 106 begins at 118 and ends at 120 which is again at zero velocity. Since the moves in this example are executed independently and serially, there are no transition points. In addition, although the first move 102 is orthogonal to the second move 104 and the second move is orthogonal to the third move 106, the moves can be at substantially any angle to each other and within any dimension.

FIG. 1b illustrates a motion trajectory 200 that is comprised of seven independent moves: a first move 202, a second move 204, a third move 206, a fourth move 208, a fifth move 210, a sixth move 212, and a seventh move 214. The start point of the first move 202 is from zero velocity as is the end point of the seventh move 214. The seven independent moves in the trajectory 200 are executed serially wherein the second move starts once the first move is complete and so on. It is to be appreciated that although the moves described herein are shown in a two-dimensional context, there is no limit to the number of dimensions that can be employed to define moves within a motion trajectory. For example, moves can be defined by N dimensions, where N is any positive integer greater than one.

FIG. 2a includes four moves based on programmed acceleration and deceleration values. An acceleration 252 and deceleration 254 are employed for a first move; and an acceleration 258 and deceleration 256 are employed for a fourth move. The acceleration 252 is equal to the deceleration 256; and the deceleration 254 is equal to the acceleration 258. The relative acceleration and deceleration values are also equal for a second and a third move within the trajectory (not shown).

Regardless of the blending regions and the velocity profiles being symmetric, the trajectory from a start point to an end start point will be the same as the trajectory from the end point to the start point if the above steps are followed. It is to be appreciated that the necessary condition for generating a symmetric trajectory is that the velocity profile must be flipped around its time axis when moving in the reverse direction. This can be achieved by either swapping its acceleration and deceleration parameters or simply by using velocity profiles with equal acceleration and deceleration limits. This technique is known in the art and will not be discussed in detail herein.

Figure 2B:
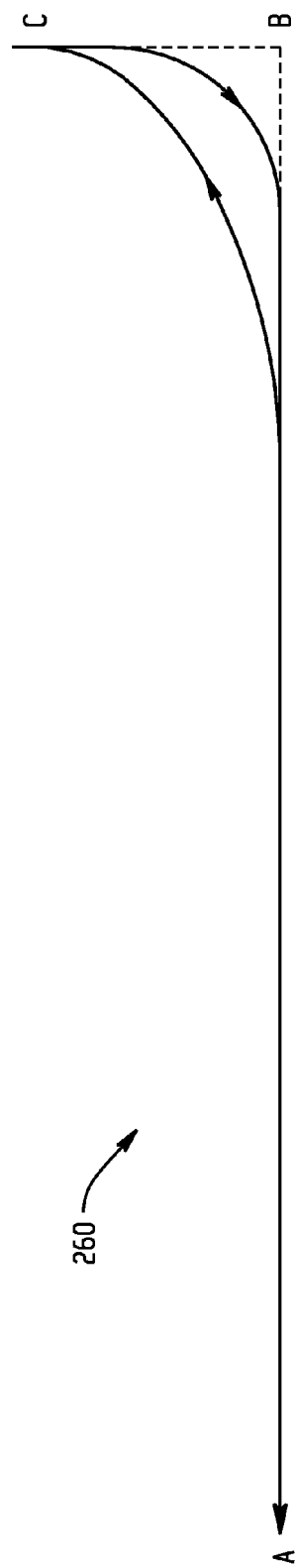
FIG. 2b illustrates an asymmetric motion trajectory that includes velocity limited moves utilizing a conventional motion algorithm, in accordance with an exemplary embodiment.

FIG. 2b illustrates a difficulty that occurs when executing trajectories utilizing conventional algorithms. Many moves desired by a programmer are velocity-limited based on the move's length, acceleration, and deceleration values. Thus, as a move's length is decreased, the maximum achievable velocity is also decreased. Utilizing conventional algorithms, acceleration and deceleration rates cannot be computed to produce symmetric profiles if the moves are velocity limited.

Figure 3:
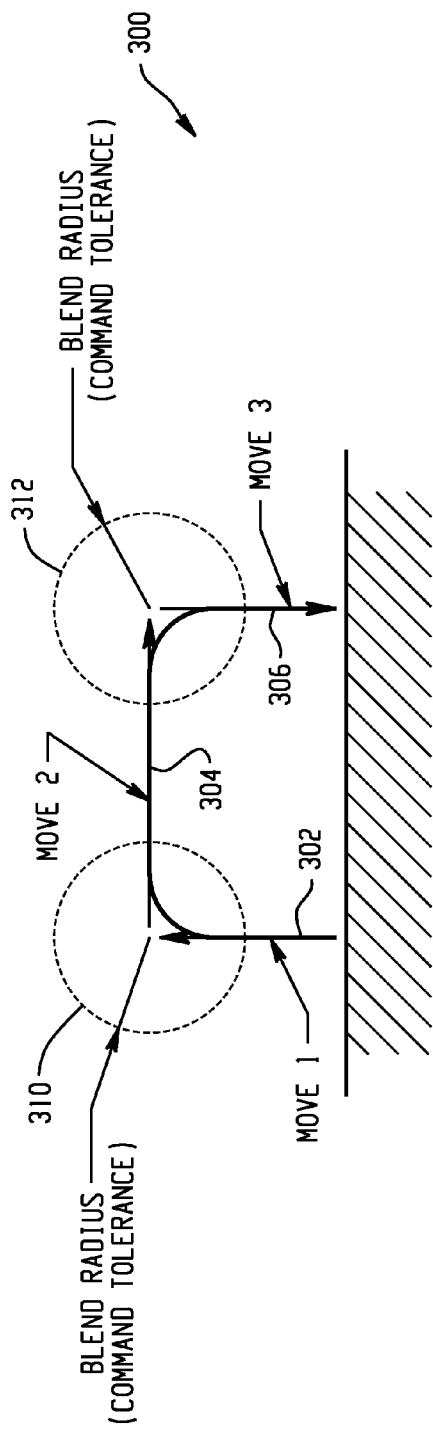
FIG. 3 illustrates a motion trajectory that utilizes two blend radii, in accordance with an exemplary embodiment.

FIG. 3 illustrates a motion trajectory 300 that is comprised of three independent moves: a first move 302, a second move 304 and a third move 306. This motion trajectory is very similar to the motion trajectory 100 illustrated in FIG. 1. The main difference is that a blend radius is employed to transition between each of the three independent moves. Blend radius 310 facilitates a transition between the first move 302 and the second move 304. Blend radius 312 facilitates a transition between the second move 304 and the third move 306.

The blend radii 310 and 312 are defined by a radius around the endpoint of the initial move (e.g., 302 and 304 respectively) of the two moves that require a transition between them. The motion trajectory varies based on whether the motion lies inside or outside of the blend radius. Outside the blend radius, the trajectory exactly matches a programmed move. Inside the blend radius, a smooth transition between moves is generated. It is to be appreciated that the smaller the blend radius, the sharper the corner and vice-versa.

The blended motion works in the following manner. The first move 302 starts. When the first move 302 reaches the blend radius, the second move 304 is started wherein the first move 302 and the second move 304 are executed simultaneously. Subsequently, the first move decelerates to zero at a predetermined time while the second move 304 continues. The superposition of the first move 302 and the second move 304 within the blend radius generates a smooth transition between the first move 302 and the second move 304. This sequence repeats for the transition between the second move 304 and the third move 306 within the blend radius 312 to create another smooth transition.

Figure 4:
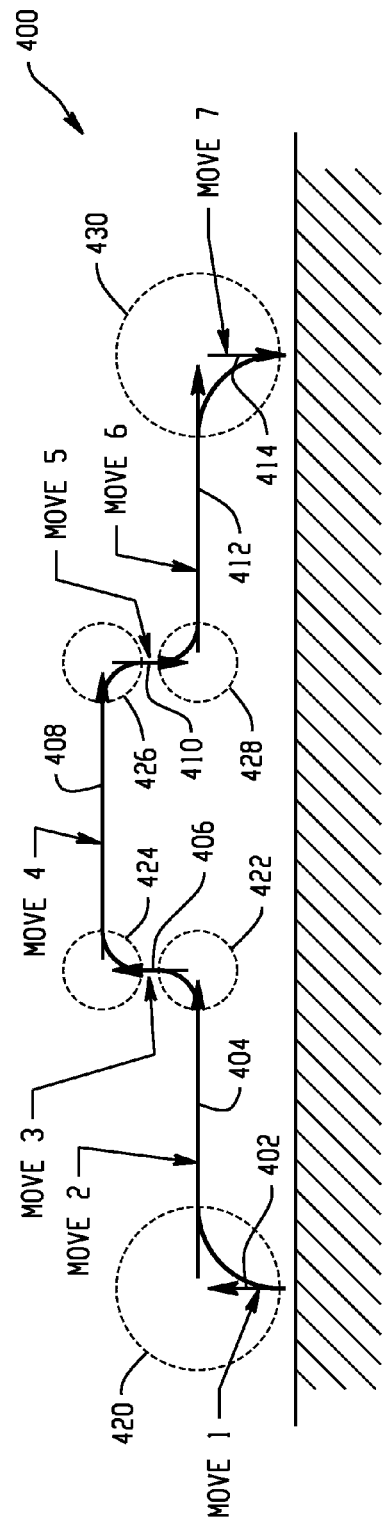
FIG. 4 illustrates a motion trajectory that utilizes six blend radii, in accordance with an exemplary embodiment.

Similarly, FIG. 4 illustrates an exemplary motion trajectory 400 that is comprised of seven independent moves 402, 404, 406, 408, 410, 412, and 414. This motion trajectory provides smooth transition points for the motion 400 via blend radii. Such motion blending provides an advantage over the trajectory illustrated in FIG. 1b.

The motion trajectory 400 includes six blend radii 420, 422, 424 426, 428, and 430 that are utilized to facilitate the transition of the first move 402 to the second move 404, the second move 404 to the third move 406, and so on. As discussed in more detail below, the first and last blend radii 420 and 430 can be one-hundred percent of the length of the shortest move being blended. This is an aspect that differs from any intermediate blend radii (e.g., blend radii 422, 424, 426, and 428) which have a maximum size of fifty percent of the shortest move length being blended. These blend radii parameters can be employed to optimize instruction execution within a motion trajectory.

It is to be noted that the blend radii can be employed in substantially any location within a trajectory. Thus, blend radii may not be employed until the third move is reached in a motion trajectory. Alternatively or in addition, blend radii can stop being utilized five moves before the motion trajectory has ended. In this manner, the "start" and "stop" points that define blend radii usage are not necessarily related to the physical beginning and end of a trajectory, which are generally associated with zero velocity. The successive moves that employ blending within a trajectory are referred to as a blended motion sequence.

Figure 5:
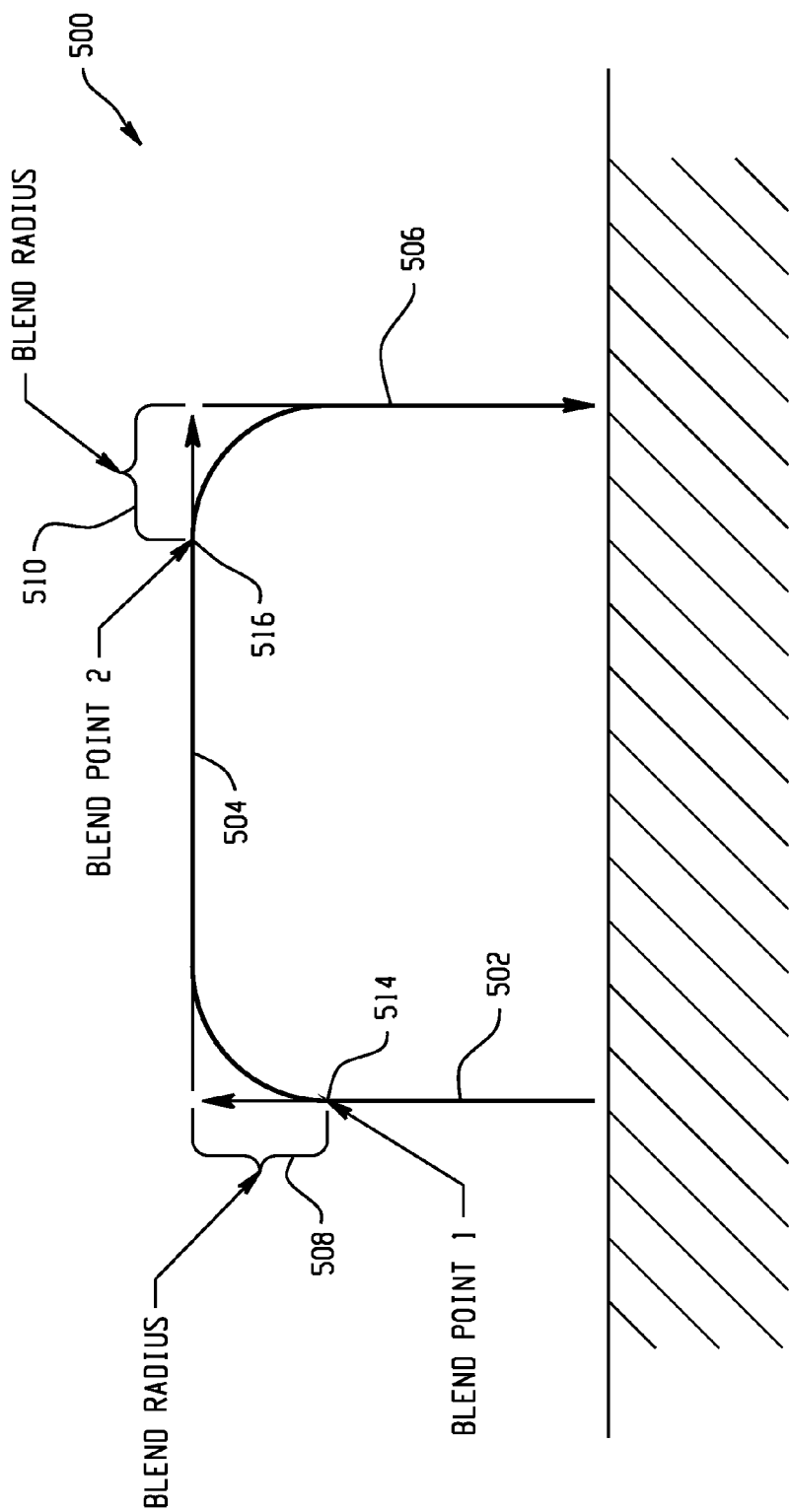
FIG. 5 illustrates a motion trajectory that identifies the blend point for each of the two blend radii, in accordance with an exemplary embodiment.

FIG. 5 illustrates a motion trajectory 500 that comprises three independent moves 502, 504, and 506 that are executed in relative succession to one another. A blend radius 508 is located between the moves 502 and 504 and a blend radius 510 is located between the moves 504 and 506. The blend radius 508 begins at a blend point 514 and the blend radius 510 begins at a blend point 516. Blend points 514 and 516 can be predetermined based on substantially any metric such as time, distance, velocity, acceleration, etc. In this embodiment, the blend points 514 and 516 are determined based on the velocity of each of the moves 502, 504, and 506.

In order to create the trajectory 500, a desired path for motion is initially defined. This path can then be broken down into a plurality of motion segments (e.g., lines, circles, etc.). A velocity profile is then calculated for each segment. Each velocity profile is divided into a blend-in region, a blend-out region, and a remainder region. Based upon this allocation for each segment velocity profile, each path segment is started in such a way that the trajectory completes in minimal time but the blend-in region of its velocity profile overlaps only with the blend-out region of the previous profile.

The blend radii 508 and 510 can serve two functions within an algorithm. First, the blend radii 508 and 510 control the trajectory curvature. Thus, a larger blend radius can result in a smoother trajectory. Second, the blend radii 508 and 510 control the cycle time. A larger blend radius means that the moves 504 and 506 start sooner since they run in parallel with the previous move. Thus, the entire trajectory 500 is completed more rapidly. As a result, the trajectory 500 speed is related to the size of the blend radii 508 and 510. The larger the diameter of the blend radii 508 and 510, the more quickly the trajectory is completed. In other words, when trajectory motion is outside a blend radius, only one move is executed. Alternatively, when motion is within a blend radius two moves are running concurrently wherein the superimposed outputs generate a smooth transition.

Figure 6:
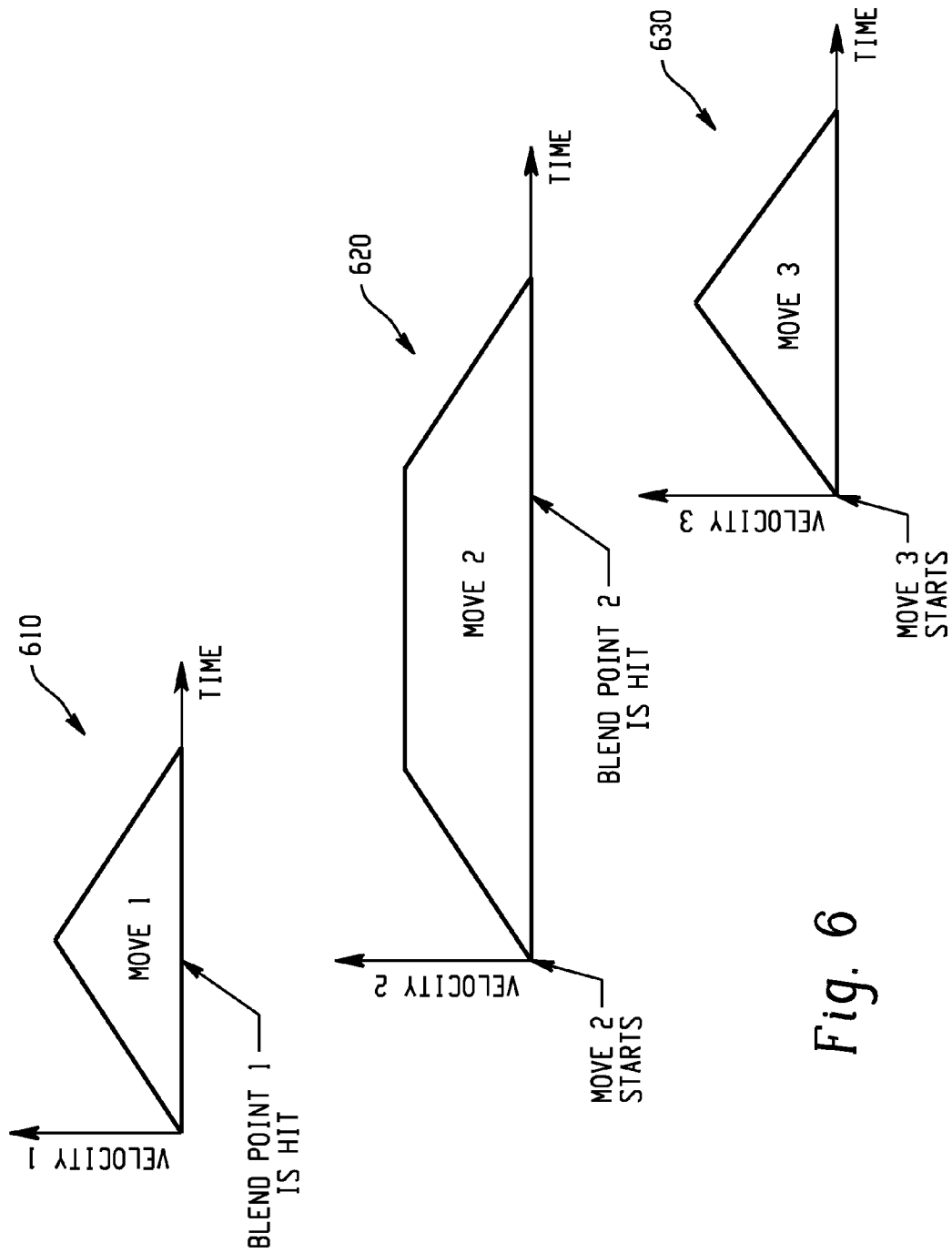
FIG. 6 illustrates the velocity of curves associated with each of the three independent moves from the motion trajectory of FIG. 5, in accordance with an exemplary embodiment.

FIG. 6 illustrates three velocity profiles 610, 620, and 630 related to each of the three moves 502, 504, and 506 within the time domain. It is to be appreciated that although the velocity is illustrated as a trapezoidal profile, it can be expressed as an S-curve, parabolic (or other polynomial), trigonometric, or other profile. Curve 610 represents the velocity of the move 502; the curve 620 represents the velocity of the move 504; and the curve 630 represents the velocity of the move 506. The time domain is the same for all the curves 502, 504, and 506. Thus, the curve 610 (and move 502) is started prior to the curve 620 (move 504) which is started prior to the curve 630 (move 506). In this manner, the moves 502-506 are partially superimposed upon one another to provide appropriate transition between moves and to speed the execution of the trajectory 500.

The curve 610 increases in velocity from zero, a stationary position, until a maximum velocity is reached approximately midway through the move 502, wherein the acceleration is zero. Once the move 502 begins to decelerate, the second move 504 is started. At approximately three-quarters of the way through the move 504, the move decelerates thereby initiating the third move 506. It is to be appreciated that the only trigger for a successive move is when a blend region begins within a current move. Thus, there is no "look ahead" or mechanism beyond the deceleration trigger for moves within a trajectory utilizing conventional algorithms.

The maximum achievable velocity for a move is based on the move's length, acceleration, and deceleration values. For a velocity limited move, as a move length is decreased for a given aspect value (e.g., acceleration, deceleration, etc.), the maximum achievable velocity is also decreased.

Figures 7, 8:
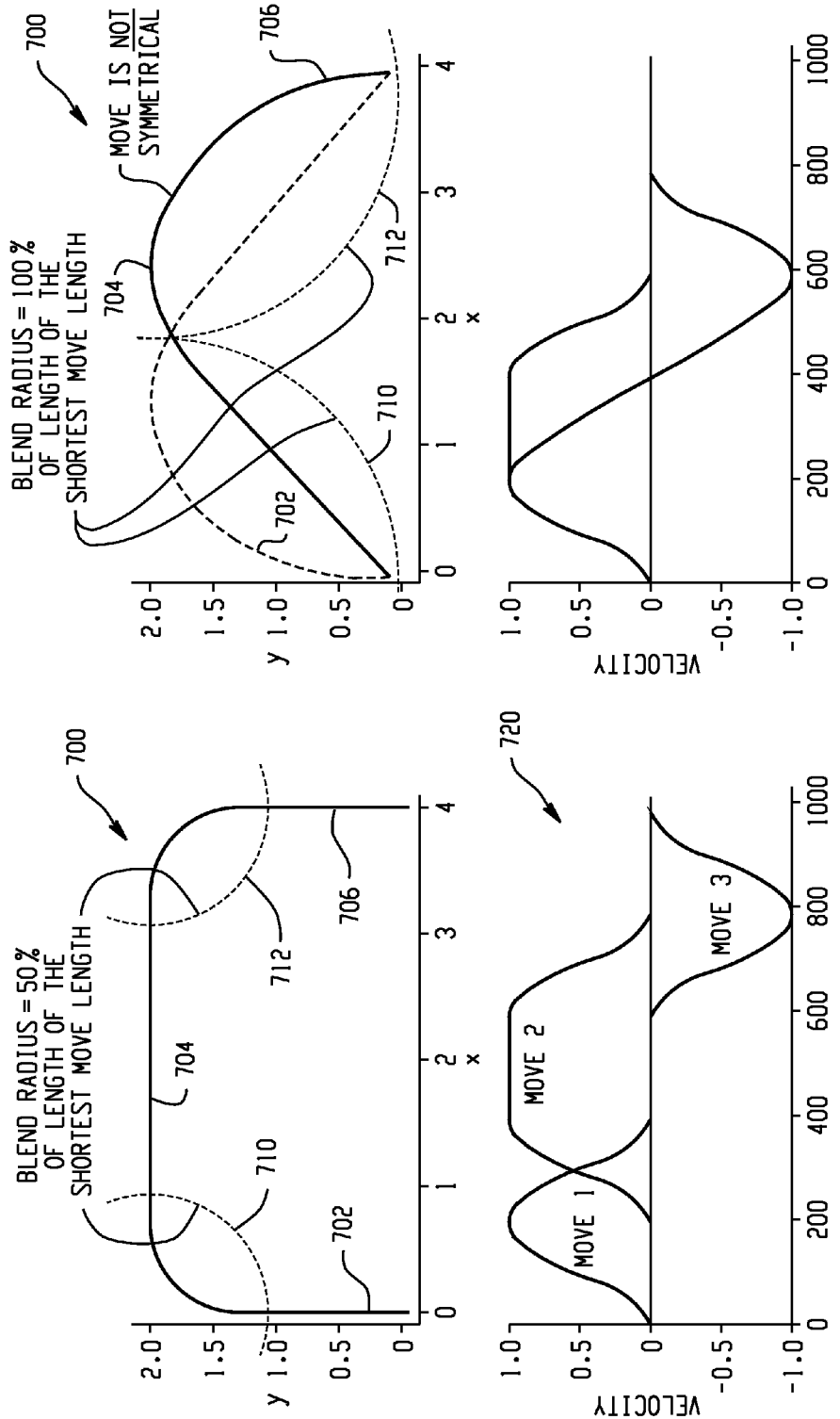
FIG. 7 illustrates a motion trajectory wherein the blend radii are fifty percent of the length of the shortest move along with the associate velocity profile for each move therein, in accordance with an exemplary embodiment.
FIG. 8 illustrates an asymmetric motion trajectory for back and forth moves wherein the blend radii are one-hundred percent of the length of the shortest move utilizing a conventional algorithm, in accordance with an exemplary embodiment.

FIG. 7 illustrates a trajectory 702 that utilizes a conventional algorithm. The trajectory 700 is shown as it relates to corresponding velocity values for each of three moves 702, 704, and 706 included therein. A blend radius 710 is utilized between move 702 and 704 and a blend radius 712 is utilized between 704 and 706. The velocity profile 720 illustrates the superposition of the moves as the trajectory 700 is executed, wherein successive moves are started before previous moves have been completed. Generally, the conventional algorithm should not increase the 710 and 712 blend radii above fifty percent of the shortest move length of the two moves being blended to keep the trajectory roughly symmetric.

FIG. 8 illustrates the trajectory 700 that utilizes a conventional algorithm wherein the blend radii 710 and 712 are equal to one-hundred percent of the shortest move length. Since the blend radii 710 and 712 are greater than fifty percent of the shortest move length, the trajectory 700 is asymmetric, wherein motion in a first direction is not equivalent to motion in a second direction.

Optimally, the move 702 completes exactly when move 704 is at a distance equal to the blend radius from its start point. If the move 702 completes before the move 704, it does not harm the trajectory shape but the profile may take more time to complete than necessary. However, if the move 702 completes after the move 704, the blend algorithm may get confused. In one example, as illustrated in FIG. 9a, the move 704 completes before the move 702 completes. Consequently, the blend trajectory is not tangential to the asymptotes.

FIG. 9a illustrates the moves 702 and 704 within the trajectory 700 wherein the blend radii 710 and 712 are equal to one-hundred percent of the shortest move length. FIGS. 9b and 9c illustrate the velocity profiles associated with the moves 702 and 704 respectively. In this example, which utilizes a conventional algorithm, the start of the move 704 is triggered by the first deceleration, 810, in the preceding move 702. The move 704 is completed before the move 702, as indicated by point 812. Because of this situation, the trajectory 700 may not be symmetric when a blend radius is greater than fifty percent of the move 702.

Figure 10:
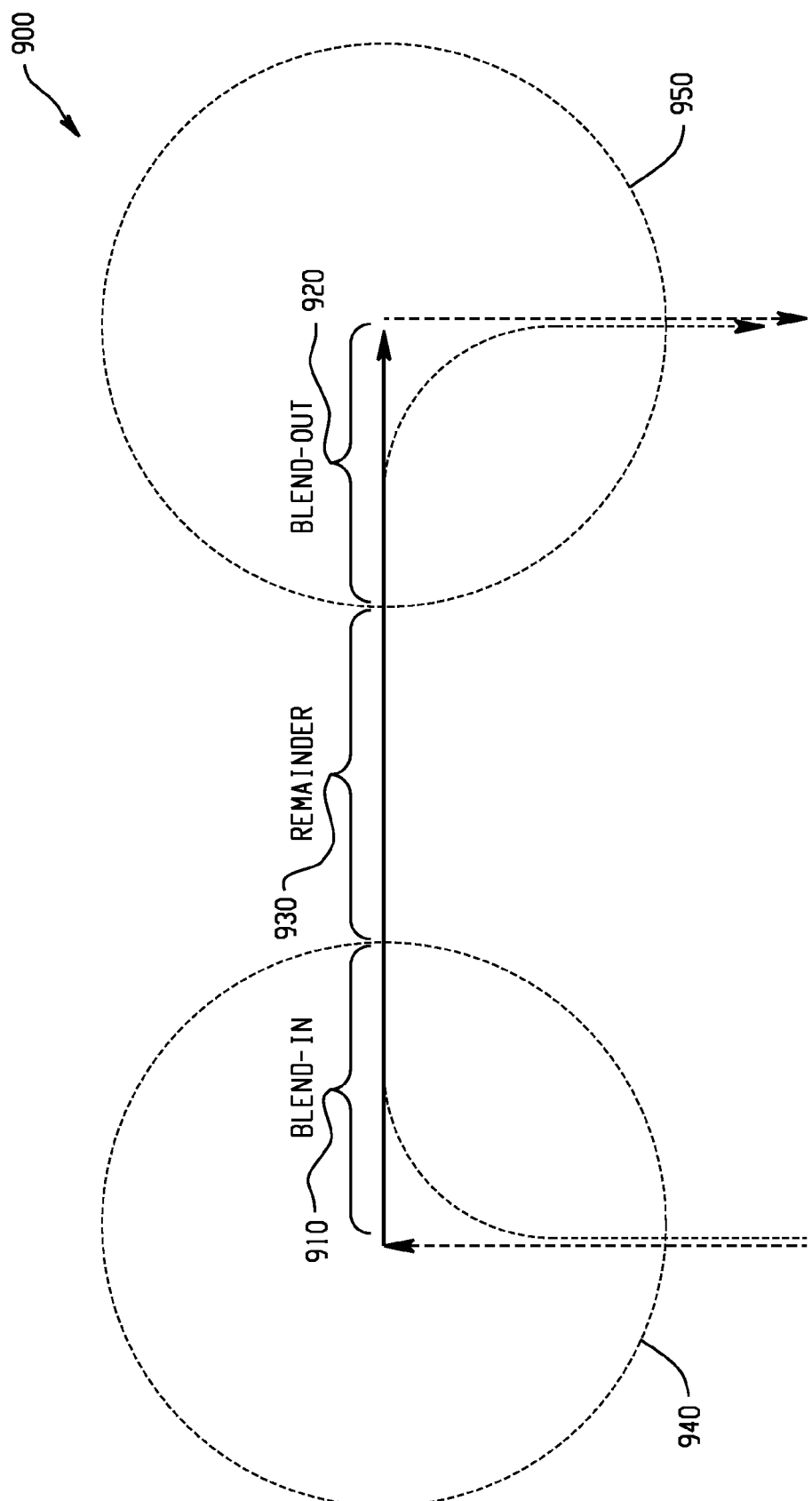
FIG. 10 illustrates a move within a motion trajectory which is divided into three regions, a blend-in region, a blend-out region and a remainder region, in accordance with an exemplary embodiment.

FIG. 10 illustrates an exemplary move 900 within a trajectory that is divided in three non-overlapping regions to prevent asymmetric trajectory motion. The three regions are: a blend-in region 910, a blend-out region 920 and a remainder region 930. The blend-in region 910 is a part of a move that may participate in blending with previous move. Typically, it is located within a blend radius 940 from a move start point. The blend-out region 920 is the part of the move 900 that may participate in blending with next move. Generally, it is located within the blend radius 950 from a move start point. The remainder 930 may not participate in any blending. Typically, it is located outside both the blend radii 940 and 950.

Figure 11:
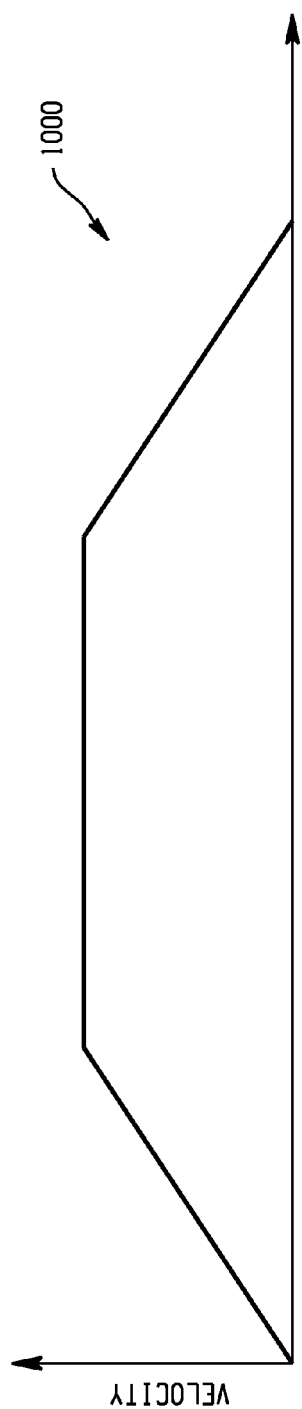
FIG. 11 illustrates a velocity profile associated with the move of FIG. 10, in accordance with an exemplary embodiment.

FIG. 11 shows a velocity profile 1000 that is associated with the move 900. The velocity is shown in relation to time and is based upon the desired distance, acceleration and deceleration parameters selected for the move 900. It is to be appreciated that the velocity, acceleration, deceleration, and jerk parameters for each move can be independently selected. However, such random parameter combinations can slow down cycle time and produce poor velocity profiles. Therefore, in one embodiment, parameters are modified so that the acceleration time of the next move profile matches the deceleration time of the current move profile. It is to be appreciated that although the velocity is illustrated as a trapezoidal profile, it can be expressed as an S-curve, parabolic (or other polynomial), trigonometric, or other profile.

Figure 12:
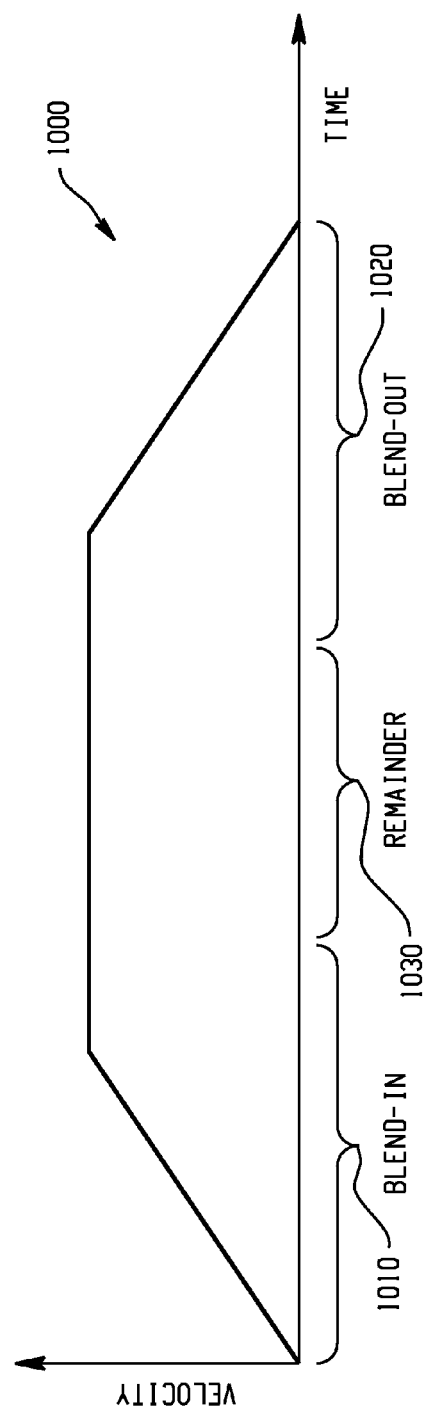
FIG. 12 illustrates the velocity profile of FIG. 11 that has been divided into three regions, a blend-in region, a blend-out region and a reminder region, in accordance with an exemplary embodiment.
Figure 13:
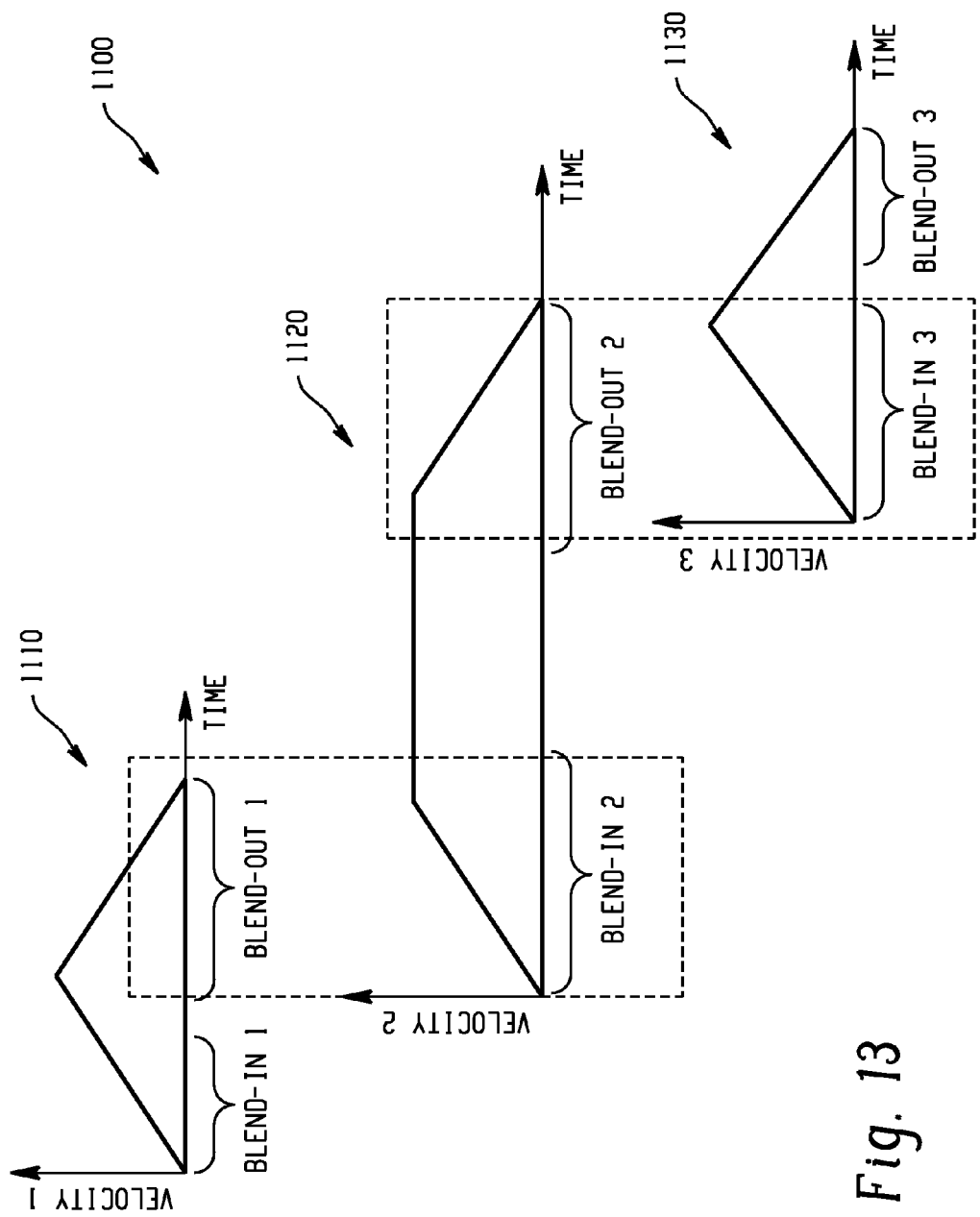
FIG. 13 illustrates the velocity profiles of three successive moves within a motion trajectory wherein each successive move is not started until the blend-out region of the previous move has been reached, in accordance with an exemplary embodiment.

FIG. 12 shows the curve 1000 divided into three disparate regions, a blend-in region 1010, a blend-out region 1020, and a remainder region 1030. In order to determine the appropriate velocity profile regions 1010, 1020, and 1030, a conversion from distance units to time units is utilized. Such a conversion is known in the art and will not be discussed in detail herein. In this manner, partitioning of the original move and partitioning of its velocity profile will be consistent. FIG. 13 expands on this idea and illustrates starting successive moves and their associated velocity profiles 1110, 1120 and 1130. In order to prevent asymmetric and/or undesired motion, the blend-out region of the current move blends only with blend-in region of the next move. In this manner, remainders of both moves may not blend at all.

Figure 14:
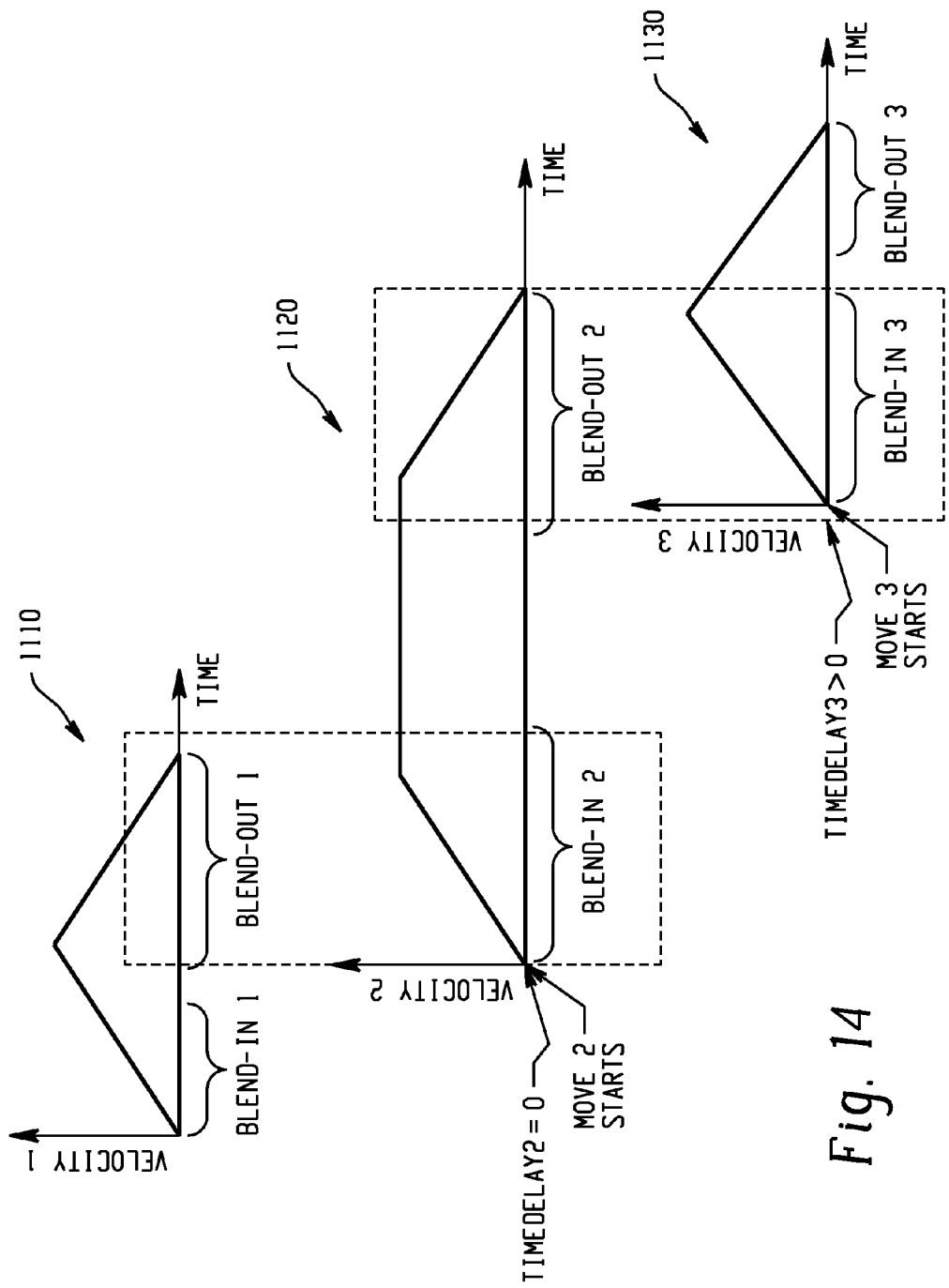
FIG. 14 illustrates the calculation of starting times for each of the three moves as shown in FIG. 13 using the improved algorithm, in accordance with an exemplary embodiment.

FIG. 14 shows the start times of successive moves in a trajectory utilizing an improved blending algorithm. The correct timing of this algorithm is achieved by delaying the start of the next move by a predetermined amount of time. This time delay is calculated by the formula:

$$\Delta T(N) = \max(0, T_{Blend-out}(N-1) - T_{Blend-in}(N)) \qquad (1)$$

where $T_{Blend-out}(N-1)$=Duration of the blend-out region of move N−1

$T_{Blend-in}(N)$=Duration of the blend-in region of move N

ΔT(N)=Time delay of the start of the move N with respect to the start of the blend-out region of the move N−1

According to formula (1), the delay between the start of successive moves within a trajectory is determined by a minimum time delay ΔT(N). It is to be appreciated that a longer delay can be employed, but there is no reason since it slows down the execution of moves within a trajectory. This time delay is at least 0, to insure that a successive move is not executed at least until the beginning of a blend-out region of a previous move.

As shown, the velocity profile 1120 associated with a second move in a trajectory does not start until the blend-out region of the first move (velocity profile 1110) is reached. Similarly, the third curve 1130 does not begin until after a predetermined time delay beyond the start of the blend-out region of the second curve 1120. This algorithm makes no assumptions about the method used for calculation of the blend-in and blend-out region of each move. As an example, these regions can be based on remaining move distance, or it can be based on remaining time, or it can be based on command velocity. In addition, different methods can be employed to calculate blend regions for each move within a trajectory.

Figure 15:
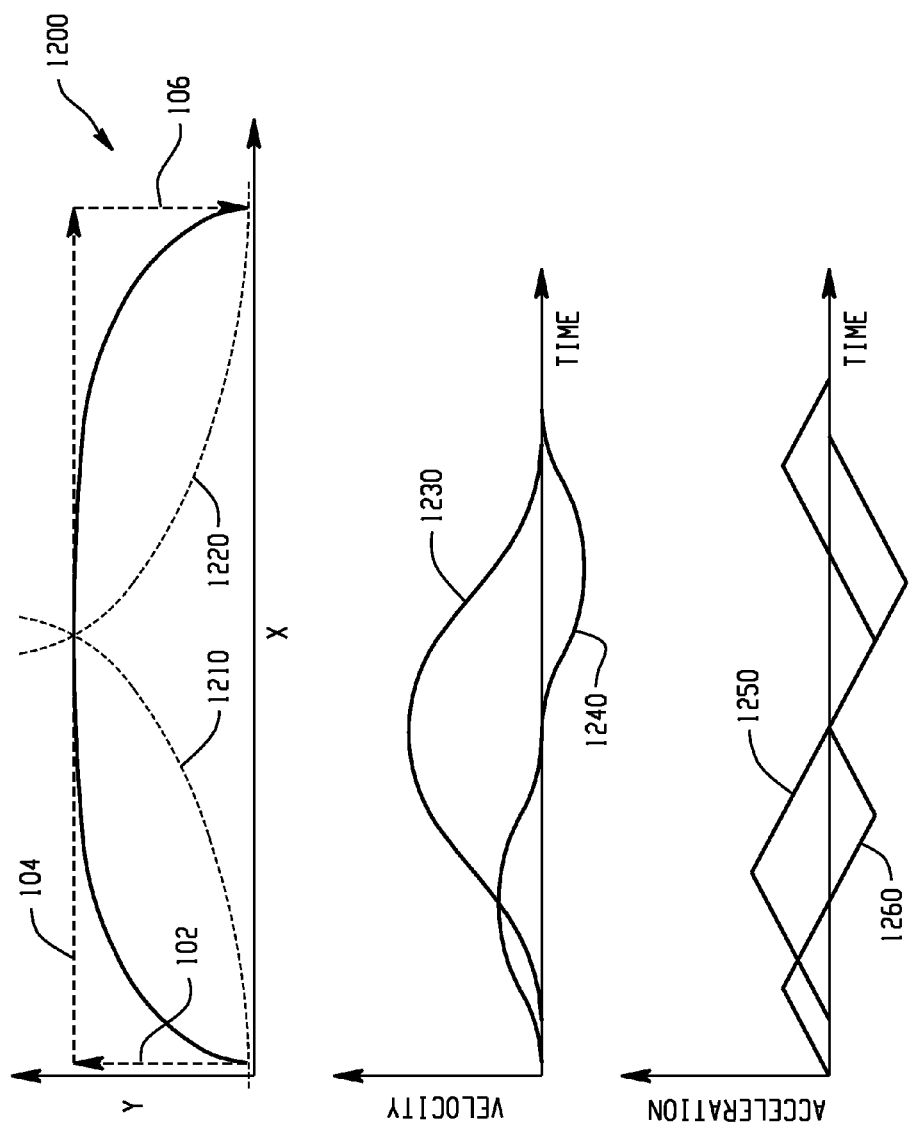
FIG. 15 illustrates a motion trajectory for back and forth moves wherein the blend radii are equal to 100% of the length of the shortest move utilizing an improved algorithm, in accordance with an exemplary embodiment; and, FIG. 16 illustrates the velocity profiles associated with the three moves of FIG. 15, in accordance with an exemplary embodiment.

FIG. 15 illustrates the use of this algorithm with a trajectory 1200 that utilizes a blend radius 1210 and a blend radius 1220. This trajectory is based upon a three move motion that is illustrated in FIG. 1, which includes moves 102, 104 and 106. The blend radius 1210 is relative to the length of the moves 102 and 104 and the blend radius 1220 is relative to the length of the moves 104 and 106. In each case, the blend radii 1210 and 1220 are defined as one-hundred percent of the length of shortest of the two moves to which they correspond. For example, the blend radius 1210 is one-hundred percent of the length of the move 102, since that move is shorter than move 104.

For S-curves, this algorithm can be utilized to eliminate acceleration steps and produce minimum finite jerk in the x and y direction. As illustrated, the trajectory 1200 has a smooth profile for its x-axis velocity 1230 and its y-axis velocity 1240 when utilizing S-curve programming. Additionally, the trajectory 1200 does not have any acceleration steps in an S-curve domain as shown by the x-axis acceleration 1250 and the y-axis acceleration 1260. By eliminating such acceleration steps, the motion path facilitates execution of high-speed processes.

Moreover, the algorithm allows complex motion to be defined by relative simple motion segments. For example, trajectory 1200 shows a complex parabolic path that can be defined via a polynomial. Instead of first determining the path that is desired (and the equation that defines such a path), a user need only specify an up move, a horizontal move and a down move. More moves can be added as needed to avoid obstacles or other machinery in a process. Once the individual segments are known, the trajectory is created based on the acceleration and deceleration parameters and size of the blend radii for moves within a blended motion sequence.

Figure 16:
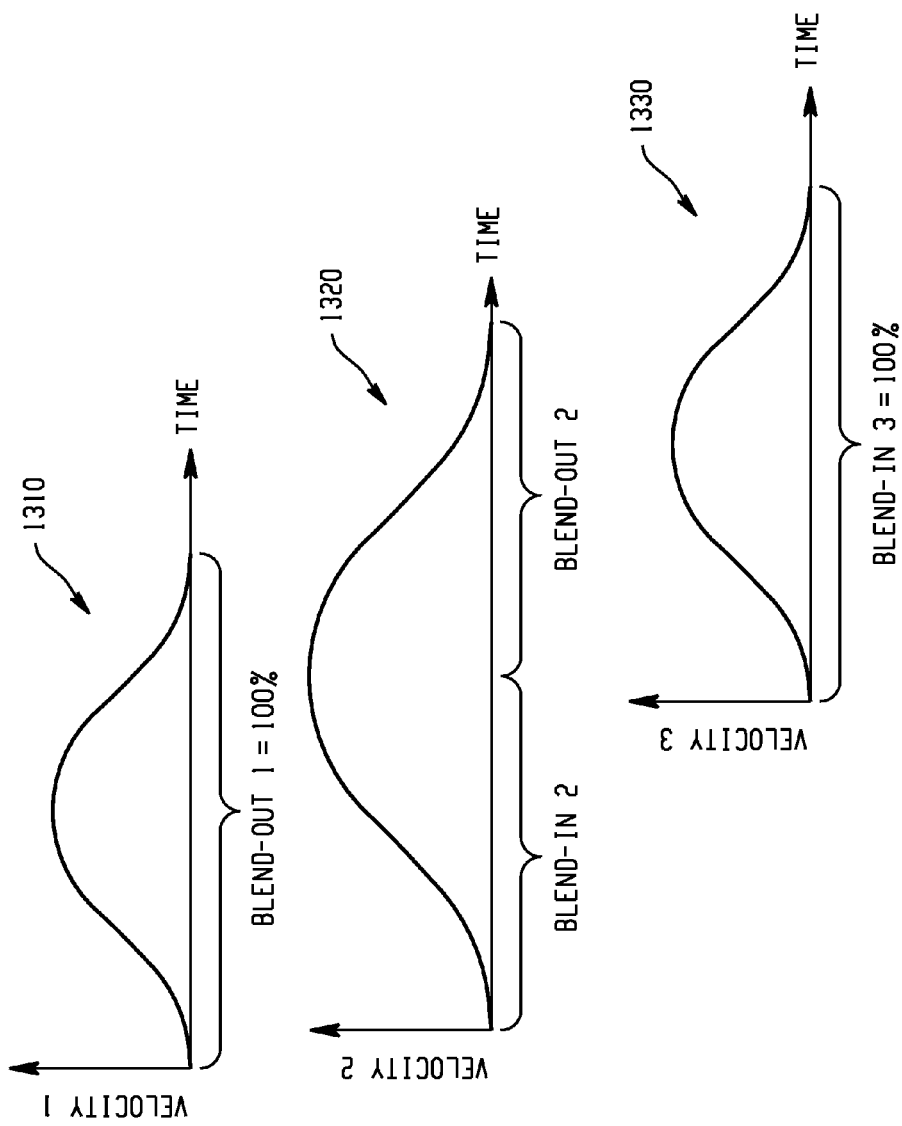

FIG. 16 illustrates three S-curve velocity profiles 1310, 1320, and 1330 that correlate the use of this algorithm with the trajectory 1200. Curve 1310 is comprised of a one-hundred percent blend-out region and curve 1330 is comprised of a one-hundred percent blend-in region. Curve 1320, which is executed between 1310 and 1330 and has only two regions, a blend-in and a blend-out. Since the algorithm does not allow blending to start until the blend in-region of a successive move is reached, a one-hundred percent blend radius can be employed to facilitate fast, accurate motion with a minimum finite jerk.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A method for generating a motion system trajectory of an automated motion device with a processor having programming instructions stored on a computer readable medium for executing the method, comprising:
   specifying a trajectory as a sequence of path segments;
   calculating a velocity profile for each of the path segments;
   dividing each velocity profile into a blend-in region, a blend-out region and a remainder region; and
   executing each path segment by the automated motion device such that the blend-in region of its velocity profile overlaps only with the blend-out region of a previous velocity profile.

2. The method according to claim 1, wherein each segment is one of a line, a circle, an arc, and defined via a polynomial.

3. The method according to claim 1, wherein the dynamics of each velocity profile associated with each path segment are dependent on parameters of a current, the previous and a next segment within the motion trajectory.

4. The method according to claim 3, wherein the only the blend-in portion of the current segment is processed before the next path segment is executed.

5. The method according to claim 4, wherein the blend-out region of the current segment is not calculated until a pending instruction is received.

6. The method according to claim 1, wherein the dividing each velocity profile into the blend-in and blend-out region depends on each segment's order within the sequence.

7. The method according to claim 1, wherein the path segments are executed sequentially.

8. The method according to claim 1, wherein the motion system trajectory is executed in one of a Cartesian coordinate system, a non-Cartesian coordinate system, a SCARA robot, a Delta robot, a cylindrical, a spherical, a polar, a picker, an articulated dependent, and an articulated independent joint space.

9. The method according to claim 8, wherein the motion system trajectory is based on N dimensions, where N is an integer that is greater than 1.

10. The method according to claim 1, wherein the blend-out region from a current move and the blend-in region from a successive move defines a blend radius.

11. The method according to claim 10, wherein, the successive moves that utilize the blend radius are a blended motion sequence, which starts at any location and stops at any location within the motion system trajectory.

12. The method according to claim 11, wherein:
   the blend radii of a first and a last segment within the blended motion sequence are less than or equal to one-hundred percent of a length of a smallest move length of the current move and the successive move for all the moves within the blended motion sequence; and
   the blend radii for the segments between the first and the last segment within the blended motion sequence are less than or equal to fifty percent of the length of the smallest move of the current move and the successive move for all the moves within the blended motion sequence.

13. A method for generating a motion system trajectory of an automated motion device, said method comprising:
   specifying a trajectory as a sequence of path segments;
   calculating a velocity profile for each of the path segments;
   dividing each velocity profile into a blend-in region, a blend-out region and a remainder region; and
   moving said automated motion device in accordance with each of said path segments by executing each path segment in the automated motion device such that the blend-in region of its velocity profile overlaps only with the blend-out region of a previous velocity profile.

* * * * *